United States Patent [19]

Miller et al.

[11] 4,316,388

[45] Feb. 23, 1982

[54] TEMPERATURE DETECTION USING THE REFRACTIVE INDICES OF LIGHT GUIDES

[75] Inventors: Robert C. Miller, Penn Hills; Frederick M. Ryan, Loyalhanna Township, Westmoreland County, both of Pa.

[73] Assignee: Westinghouse Electric Corp., Pittsburgh, Pa.

[21] Appl. No.: 178,049

[22] Filed: Aug. 14, 1980

Related U.S. Application Data

[63] Continuation of Ser. No. 14,014, Feb. 22, 1979, abandoned.

[51] Int. Cl.³ .................................................. G01K 11/12
[52] U.S. Cl. .................................................... 73/356
[58] Field of Search ......................................... 73/356

[56] References Cited

U.S. PATENT DOCUMENTS

| | | | |
|---|---|---|---|
| 3,609,731 | 8/1968 | Evans | 340/277 |
| 3,960,017 | 6/1976 | Romanowski | 340/227 |
| 4,117,460 | 9/1978 | Walworth | 340/190 |
| 4,136,566 | 1/1979 | Christensen | 73/356 |
| 4,151,747 | 5/1979 | Gottleib et al. | 73/356 |

*Primary Examiner*—S. Clement Swisher
*Attorney, Agent, or Firm*—G. H. Telfer

[57] ABSTRACT

A temperature detection apparatus is provided which comprises at least one light source, light guide and light detector. The light guide is placed in thermal communication with target areas whose temperatures are of interest, particularly for application in electromechanical apparatus where the target area whose temperature is of interest is relatively inaccessible and/or an electrical temperature probe would encounter interference. The light guide itself indicates temperature changes since it only transmits light when the temperature-dependent refractive index of its core exceeds that of its cladding.

10 Claims, 7 Drawing Figures

TEMPERATURE DETECTION USING THE REFRACTIVE INDICES OF LIGHT GUIDES

This is a continuation of application Ser. No. 014,014, filed Feb. 22, 1979 now abandoned.

BACKGROUND OF THE INVENTION

This invention concerns a temperature measuring apparatus and method. More particularly, it relates to an apparatus for measuring temperature in an electromechanical machine by a temperature detection probe using fiber optics.

The modern reality faced by the power generation industry is that equipment more and more is operated near its maximum current and voltage ratings. Along with these operating conditions comes an increase in unwanted heating of components. Reliability, maintenance and operation life of electrical equipment are directly affected by its operating temperature. When this temperature exceeds a certain value for any appreciable period of time, the life of the apparatus rapidly decreases.

Information as to "hot spots" and "over-temperature" conditions existing in the apparatus may indicate improper operation, defective parts, degradation of insulation, or even possible failure. Gathering that information, however, may prove difficult. Frequently conductors and equipment are at a high potential relative to ground. This high voltage, or its associated electromagnetic interference, hampers measurement of temperature directly on the conductors and makes use of metallic probes ill advised. For one reason, connections involving metallic conductors are susceptible to dangerous flashovers. Also, any currents induced in a metallic temperature sensor by the high potential could interfere with accurate temperature measurement.

It is desirable, therefore, to provide a device which incorporates a dielectric probe insertable in the electromechanical machine. It should be capable of continually measuring temperature during the operation of the machine and of effectively detecting places of excessive temperature within the machine, known as "hot spots". Such a dielectric probe should be immune to the effects of vibration so as to find its widest possible utility. In addition, it should be reusable without repair, in contradistinction to fuses, to minimize costs and service requirement.

Measuring the temperature is only the beginning of the problem. That information must then be communicated to the operator or control center for the particular machine. All too frequently the target area, whose temperatures are of interest, is buried deep within a labyrinth of electrical and mechanical components. It may be located in a most inaccessible location deep within the machine.

Previously many techniques have been used to measure temperature. The high potentials, or the other harsh aspects of the industrial environment, have rendered these prior attempts less than adequate.

One previous thermometer employed a common thermocouple to measure temperature changes within a power generator. This technique required extending the thermocouple's leads through the generator's housing. Thus a high potential conductor, with its associated bushings and insulation, was required just to monitor temperature. One approach to resolving this problem was the use of a radio transmitter. Connecting radio transmitters to the temperature sensing device, however, requires dealing with the presence of the electromagnetic field. The electromagnetic field interferes with signal transmission.

Non-metallic, non-magnetic temperature sensors have been previously sought. An avenue of solution explored has involved the use of fiber optics. For example, U.S. Pat. No. 3,960,017 uses fiber optics to optically read a thermometer, and transmit the information out of a transformer's winding. The temperature sensing column extends or contracts linearly, relative to the temperature, and across the opposing aperture of juxtaposed light pipes. This partially blocks light transmission which thereby makes light intensity proportional to temperature.

Another solution involves optic fibers in conjunction with a liquid crystal. This combination has been proposed for temperature measurement in biological research of living tissue. The liquid crystals become opaque with temperature changes, partially blocking transmitted light. The opacity is first calibrated against a standard thermometer, and then in operation, the probe containing the liquid crystals is illuminated and read by separate fiber optic light guides.

It is the case that certain properties of the light guide itself are affected by changes in temperature. As shall be discussed hereinafter, one of the properties, the ratio of the refractive indices of the materials from which the light guides are constructed, is both important for transmission and dependent on temperature.

SUMMARY OF THE INVENTION

Making use of the light guide itself to indicate temperature changes, a temperature measuring apparatus, constructed in accordance with the present invention, comprises at least one light guide, light source and light detector. The light guide is composed of a cladding extending concentrically around the core. The materials of the core and the cladding are selected such that their respective indices of refraction vary with temperature over a predetermined temperature range. The transmission of light through the light guide only occurs when the index of refraction of the cladding is less than that of the core. Detectable changes in the transmitted light correspond therefore to heating or cooling within a certain range of temperatures. A section of the light guide is placed in thermal communication with a predetermined target area whose temperature is of interest. The target area may be located in an electromechanical machine such as a motor, generator, or transformer. The light guide may be maintained within the machine to measure temperature during design, testing or on-line operation.

A light source supplies a regulated predetermined light to one end of the light guide for transmission towards a second end. When the light reaches this latter point, the transmission is detected by a light detector. The source may supply, for example, a white, visible, monochromatic, ultraviolet or infrared light. The light detector either permits visual inspection of the transmitted light, or measures a preselected property such as intensity of the light. For example, if the transmitted light reaching the light detector has an intensity which is detectably different from that of the supplied light, the temperature of the target area has equalled or passed the critical temperature for that particular light guide.

BRIEF DESCRIPTION OF THE DRAWINGS

The invention will be more fully understood from the following detailed description of preferred embodiments, taken in connection with the accompanying drawings, in which.

DESCRIPTION OF THE PREFERRED EMBODIMENTS

Figure 1:
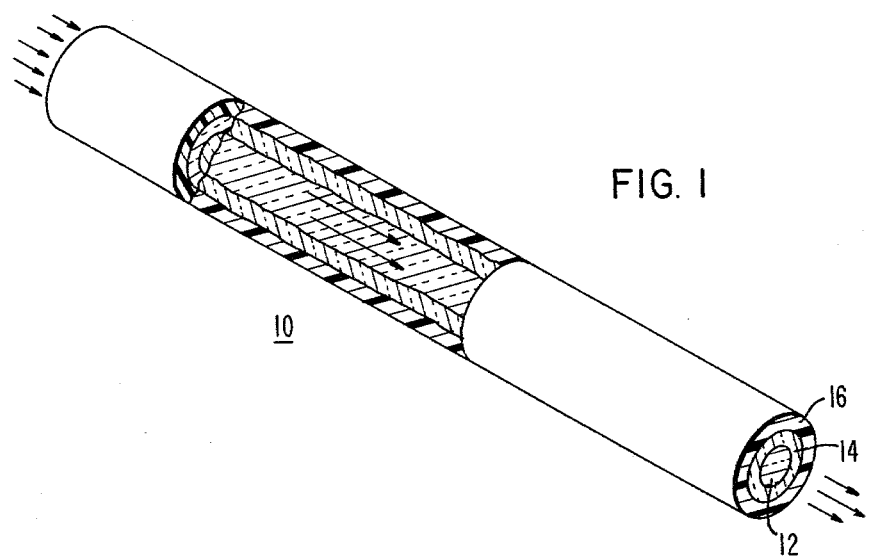
FIG. 1 is an enlarged perspective illustration, partly cutaway, of a light guide of the type utilized in the present invention.

The basic construction of a light probe, generally designated by the reference numeral 10, is depicted in FIG. 1. This illustration contains an axial section of a light guide 10 of the type utilized in the present invention. As shown, the light guide 10 includes a core 12 concentrically surrounded by a cladding 14. Both the core 12 and cladding 14 may be, for example, constructed from selected glasses, plastics and liquids. Individual or bundles of light guides are often encased in a light jacket 16 which preserves the integrity of the transmission by protecting the core 12 and cladding 14 from cuts and abrasion.

A light guide 10, known also as a fiber pipe or optic guide, is essentially a tube capable of transmission of light. Transmission imports propagation or guidance of the light. The transmitted light may be continuous or in pulsed signals. The light beam is only transmitted when the refractive index of the core 12 is larger than the refractive index of the cladding 14. The materials are chosen so that their temperature-dependent refractive indices vary at different rates with temperature. The indices have, in other words, relatively large and differing temperature coefficients.

Figure 2:
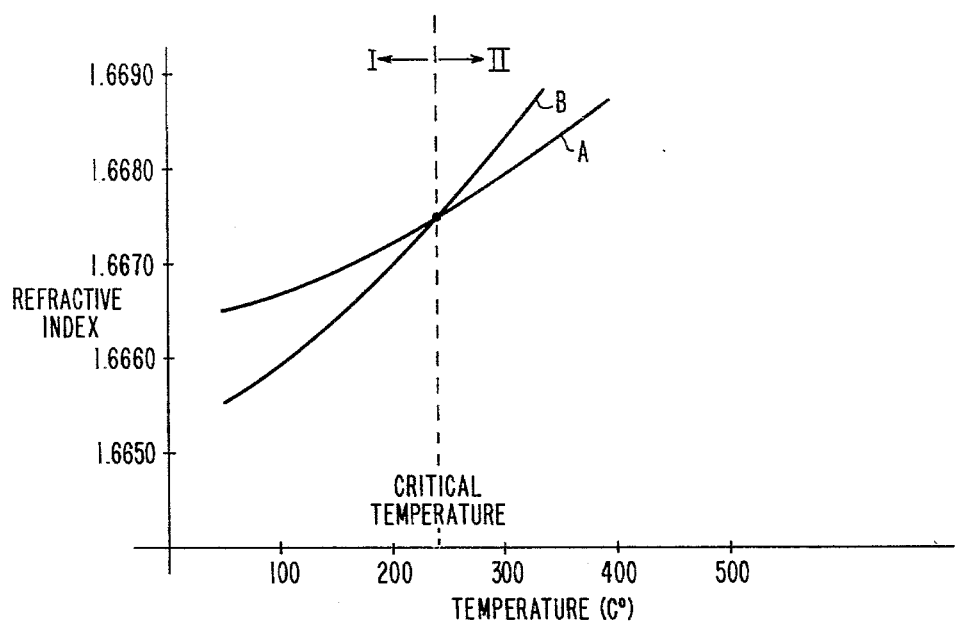
FIG. 2 is a graph which depicts the dependence of refractive indices on temperature for certain core and cladding materials.

FIG. 2 is a graph in which the refractive indices are plotted against temperature at a wavelength band of light of approximately 643 nm, for one pair of commercially available Schott glasses which can be used as core and cladding materials. Curve "A" is the plot for Normal Barium Flint Glass, Number 10, (BaFN 10) and curve "B" is the plot for Special Barium Flint Glass, Number 12, (BaSF 12). Both glasses are made by Schott Optical Glass Company. At 240° C. the two curves cross. This point, designated "$T_c$", is the critical temperature for this particular combination of materials.

The following table is a compilation of the refractive indices of a variety of materials from which cores and claddings can be made. Examples of possible combinations of materials appropriate for the practical application of this invention are also provided, along with their associated critical temperatures:

TABLE I

| Core Material Refractive Index | Cladding Material Refractive Index | Critical Temperature |
| --- | --- | --- |
| 1. Normal Barium Flint Glass, No. 10 1.6665 at 643 nm and 20° C. | Special Barium Flint Glass, No. 12 1.6657 at 643 nm and 20° C. | 240° C. |
| 2. Benzene Liquid 1.5132 at 486 nm and 20° C. | Polycyclohexyl methacrylate 1.513 at 486 nm and 20° C. | 22° C. |
| 3. Quartz 1.5446 at 588 nm and 20° C. | Glass type 541; Light Barium Crown 1.5407 at 588 nm and 20° C. | 450° C. |

Known commercially available light guides typically are constructed from core and cladding materials having an associated critical temperature, if any, well outside any temperature which would be of industrial utility.

Figure 3:
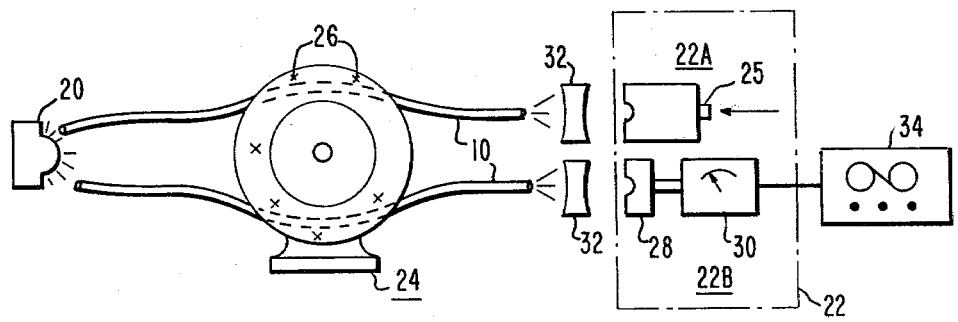
FIG. 3 is a pictorial illustration of a temperature monitoring apparatus in accordance with one embodiment of the invention.

FIG. 3 is a pictorial illustration of a temperature monitoring apparatus constructed in accordance with the present invention and can best be understood with simultaneous reference to FIG. 2. A light source 20 supplies light to a first end of a plurality of the light guides 10. The light source 20 may be of any conventional type which can supply the preselected light, for example, a light emitting diode (coherent or noncoherent), a tungsten lamp, or any monochromatic light source. As shall be discussed below, the refractive index is a function of the transmitted light's wavelength. The light source 20, therefore, must provide a light at a predetermined wavelength band. Furthermore, each light guide 10 will only transmit light to its second end when the refractive index of its core 12 is greater than that of its cladding 14.

Though it need not always be the case, each material with refractive indices plotted in FIG. 2 may comprise either the core 12 or the cladding 14. In a first of the two possible permutations, the material of curve "A" may be the core 12 and the material of curve "B" the cladding 14. Since light is only transmitted when the refractive index of the core 12 exceeds that of the cladding 14; transmission only occurs at this wavelength of light for this selection of materials at those temperatures below the critical temperature, i.e., in the region marked with the Roman numeral "I". A negligible amount of light reaches a light detector 22 whenever any point along the light guide 10 goes above the critical temperature. In the other permutation, curve "B" becomes associated with the core 12 and "A" corresponds to the cladding 14. Here, light is transmitted in Region "II" only.

To reiterate, the temperature monitoring apparatus of FIG. 3 can yield either (1) whether the hottest spot along the fiber guide has exceeded the critical temperature; or (2) choosing another predetermined pair of materials, whether the coldest spot has dropped below the critical temperature.

OPERATION

At this point in the discussion of the figures, it is best to continue the explanation of the embodiment of FIG. 3 with regard to one of its possible industrial applications. In this use, at least a section of single light guide 10, is placed in thermal communication with at least one target area 26. This area may be located within an electromechanical machine 24 such as a motor, generator or transformer. The temperature measuring apparatus will warn, for example, when the temperature of the hottest of those target areas 26 has exceeded the critical temperature for the particular light guide 10. The light guide 10 should be chosen to have a predetermined critical temperature equal to, or by a safety margin, less than the maximum temperature rating of the machine.

Light is introduced from a predetermined light source 20 at a first end of the light guide 10.

A light detector 22, receptively disposed in light communication with a second end of the light guide 10, monitors or detects some property of the light, such as intensity at preselected wavelength bands. Several different light detectors may be used, such as those designated in FIG. 3 as 22A and 22B. The light detector 22A includes an aperture 25 through which the transmitted light can be visibly inspected. Either substituting for or supplemental to this inspection capability, a metering capability may be desirable. The light detector 22B includes a light-sensitive device 28 which converts the light transmitted to the device into an electrical signal which is proportional to the light, such as a photodiode, phototransistor or photo-multiplier. The light sensitive device 28 is electrically connected to a metering means 30 and, if desired, to a recording means 34 to provide a permanent record of temperature. The metering means 30 may indicate changes in the intensity of the transmitted light, or indicate the amplitude of the pre-calibrated electrical signal so as to provide a quantitative readout of the intensity.

POINT TEMPERATURE DETECTION

The temperature detection apparatus as discussed above may be inappropriate for those applications in which the temperature-dependent light guide, in order to reach a target area in a machine, must also pass through a point which may be warmer than the target area. Light loss will occur at those "warmer" areas, and thus the amount of light reaching the light detector will not be indicative of the temperature of the target area. To this end, a temperature detection probe is desired which will not be affected by warmer temperatures existing at other than the target areas. Such a probe may be called a "point temperature sensor", in contradistinction to a "line temperature sensor".

Figure 7:
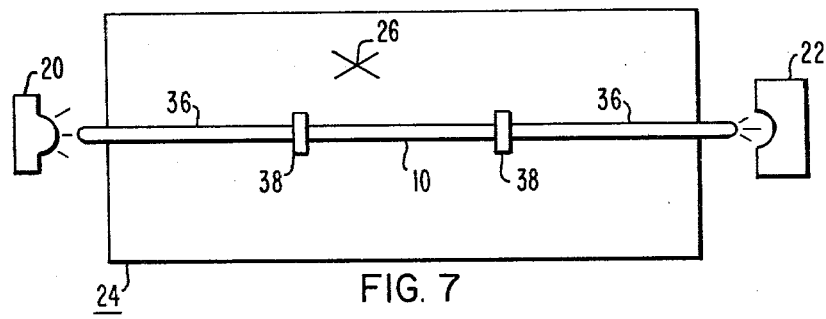
FIG. 7 is a pictorial illustration of a point temperature probe constructed in accordance with one embodiment of the invention.

A point temperature probe, as shown in FIG. 7, comprises: a segment of temperature-dependent light guide 10 as discussed above; at least one data-link 36, such as a commercially-available, conventional light guide; a light source 20 and detector 22; and couplings 38 which connect the temperature-dependent light guide 10 and the data-link 36, to form a light path. The coupling 38 may be, for example, a mechanical fastener or an adhesive. The data link 36 may be any transmitter of light which is relatively loss-free (or capable of a predetermined transmission) over the experienced temperatures.

In operation, the temperature-dependent light guide 10 is placed in thermal communication with a target area 26. Light is transmitted from a light source 20 by a first data-link 36, to and through the temperature-dependent light guide 10, and then through a second data-link 36 to a light detector 22.

The "data-link to light-guide to data-link" connection can be repeated if several target areas are of interest; each target area in thermal communication with one of the temperature dependent light guides.

QUANTITATIVE TEMPERATURE MEASUREMENT

The index of refraction is, as previously known, a function of wavelength. Since the critical temperature is defined by the relative refractive indices of the core and cladding materials, a change in the indices would result in a shift in the critical temperature.

Figure 4:
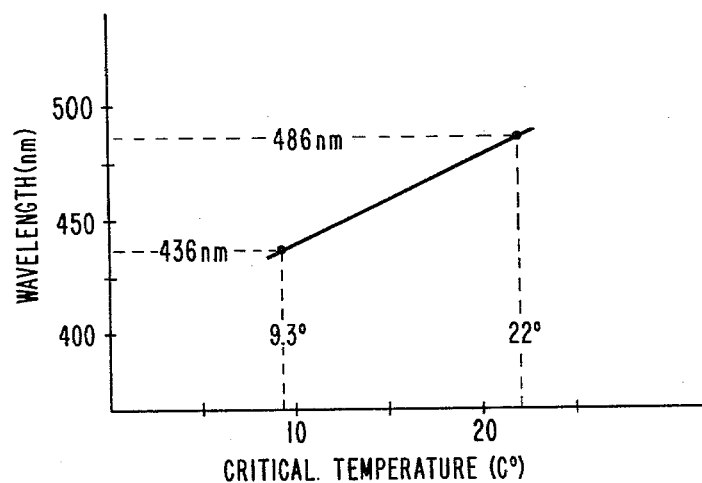
FIG. 4 is a graph depicting the range of critical temperatures corresponding to different wavelengths of light.

FIG. 4 is a graph depicting the ranges of critical temperatures corresponding to different wavelengths of light. The particular light guide utilized in deriving the data for this graph, as well as the graphs in FIGS. 5 and 6, was one having a core of Benzene liquid and a cladding of polycyclohexyl methacrylate. It can be seen that, for this light guide at these wavelengths, a 50 nanometer change in wavelength of light shifted the critical temperature by approximately 13 degrees.

Figure 5:
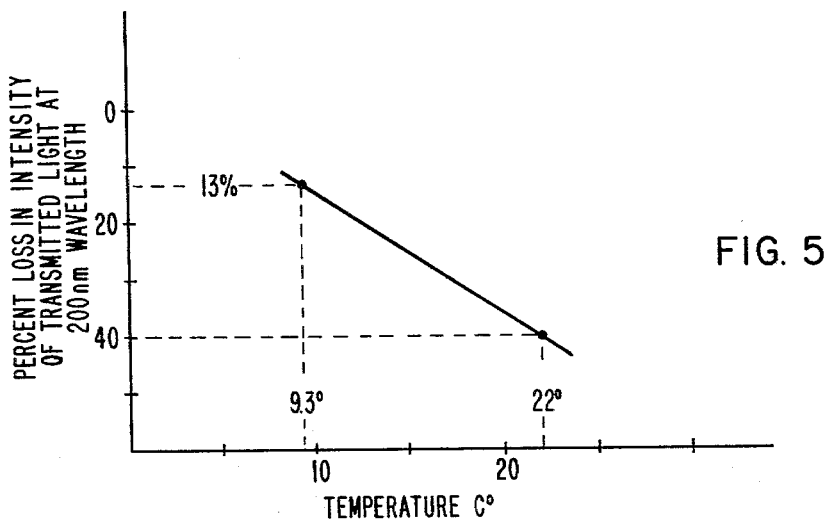
FIG. 5 is a graph plotting, for one particular wavelength, the percent loss in intensity of transmitted light against temperature.

FIG. 5 further illustrates the interrelationships of intensity, wavelength and temperature. The ordinate represents the percent loss in intensity of transmitted light. The light supplied was at a wavelength of 200 nanometers. It can be seen from the graph that over the same temperature range as in FIG. 4, the intensity changed by 27 percent at this wavelength. This change in intensity could be visibly detected by light detector 22A.

Operationally, a quantitative measurement of the temperature of the target area can be achieved utilizing this shift in the critical temperature. Either a white light source (e.g. a uniform intensity, 400 nm to 700 nm source) or a monochromatic source can be utilized.

Referring again to FIG. 3, where the light source 20 supplies a white light to the light guide 10, a filtering means 32 should be placed between, and in light communication with, the light guide 10 and the light detector 22. The filtering means should pass a wavelength band, for example, less than 10 nanometers wide. The filtering means 32 may be, for example, a filter or a beam splitter. If a beam splitter is incorporated, then a light detector 22 would be necessary for each of the beams to be detected.

Where light of one preselected wavelength, or a narrow band such as one less than 10 nanometers wide, is supplied by the light source 20, then the intensity of that light can be measured by the light detector 22 without a filtering means.

Figure 6:
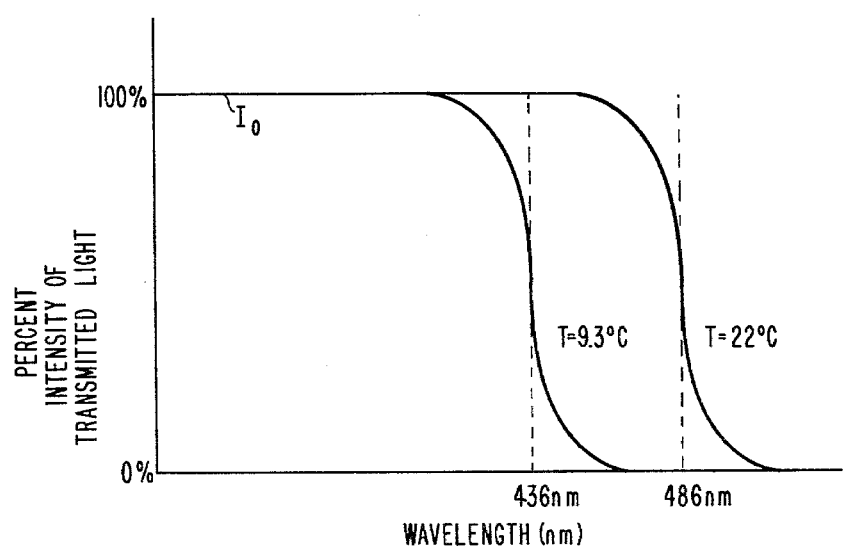
FIG. 6 is a graph of intensity of transmitted light against wavelength for two temperatures.

In FIG. 6, the intensity of the light is plotted against the wavelength at two temperatures. The light supplied from the light source is at a predetermined intensity, which, for discussion, shall be "$I_o$".

To further provide an aid to understanding, an example of a possible operational use shall be explained with reference to FIGS. 3 and 6.

In this example, the light source 20 supplies white light, and the filtering means 32 can pass one wavelength at a time, either 436 nm or 486 nm. At 9.3° C. the 436 nm light is no longer transmitted by the light guide. (A light detector 22 without the filtering means 32 would indicate a decrease in the total intensity, $I_o$.) With a further heating of any of the target areas 26, light at other frequencies would be lost. At 22° C. the light at 486 nm would not be transmitted. Thus, if the appropriate filters are utilized to examine the light and it is found that 486 nm light is transmitted while 486 nm light is not, it can be determined that the warmest temperature of the target areas 26 is between 9.3° C. and 22° C.

If the light detector designated 22A is utilized, and if a white light between 400 nm and 600 nm is supplied, the light emitted through the aperture would appear blue at 9.3° C. and visibly change in color as the target areas heat, thereby eliminating other frequencies.

With an adjustable monochromatic light source instead of the white light, only the desired frequencies need be supplied. As the temperature increased, the predictable result would be the lack of transmission of certain frequencies.

Utilizing a single guide does not indicate the size and location within the machine 24 of a hot spot, nor the thermal condition of the remainder of the machine 24. Information as to these can be provided by utilizing more than one light guide. Two or more light guides 10, each characterized by different critical temperatures, can be located in thermal communication with the same target areas 26. These for example, could be enclosed in the same jacket 16 and driven by a common light source 20, but they must be connected to separate light detectors 22. The light detectors 22 would then indicate which critical temperatures have been exceeded. Location of at least two light guides 10 in thermal communication with different, though possibly juxtaposed, target areas 26 will provide temperature information as to the location of the hot spots and their size, as well as provide mutually independent monitoring of temperature within the machine 24.

We claim:

1. A temperature detection apparatus comprising:
   at least one light guide, said light guide including a core and a cladding cylindrically extending around the core; said core and cladding constructed from respective first and second materials having temperature dependent refractive indices over a temperature range with said first core material having a higher refractive index than said second cladding material over a first portion of said range during which said light guide is transmissive of light and said first core material having a refractive index that is equal to or lower than said second cladding material over a second portion of said range during which said light guide is non-transmissive of light;
   a light source for supplying a predetermined light into a first end of said light guide; and
   means for detecting the presence or absence of light transmitted to a second end of said light guide as an indication the temperature to which said light guide is subjected is respectively in the first or second portion of said temperature range.

2. The temperature detection apparatus of claim 1 wherein: said core material has a refractive index greater than that of the cladding material for those temperatures below the temperature at which said refractive indices are equal.

3. The temperature detection apparatus of claim 1 in combination with an electromechanical machine having one or more preselected target areas whose temperatures are of interest, said target areas being disposed in thermal communication with at least a section of the light guide.

4. The temperature apparatus of claim 1 wherein the detector means includes a light sensitive device that is responsive to transmitted light.

5. The temperature detection apparatus of claim 1 comprising at least two of said light guide having different respective core and cladding materials; and
   the light source supplies light into a first end of each of said light guides and the detector means separately detects the light transmitted to a second end of each of said light guides.

6. The temperature detection apparatus of claim 1 wherein:
   (1) the light source supplies a predetermined white light of uniform intensity; and
   (2) the light detector means comprises
      (a) a light sensitive device for converting a light transmitted to the device into an electrical signal, said electrical signal being proportional to the intensity of the light transmitted to the device,
      (b) means for filtering the light, said filtering means disposed in light communication with and between the second end of said light guide and the light sensitive device, and
      (c) means for metering the electrical signal from the light sensitive device.

7. The temperature detection apparatus of claim 6 wherein:
   the filtering means passes light of a wavelength band less than 10 nanometers wide; and the metering means measures changes in the electrical signal.

8. The temperature detection apparatus of claim 6 wherein:
   the filtering means passes light of a wavelength band less than 10 nanometers wide; and
   the metering means measures the amplitude of the pre-calibrated electrical signal, thereby yielding the intensity of the light transmitted to the light sensitive device.

9. The temperature detection apparatus of claim 1, further comprising:
   (a) a first data-link, optically disposed between said light source and the first end of the light guide, said first data-link capable, over both portions of the temperature range, of a predetermined transmission of a supplied light;
   (b) means for mechanically coupling the first data-link to the first end of the light guide;
   (c) a second data-link, optically disposed between the second end of the light guide and the light detector, said second data-link capable over both portions of the temperature range, of a predetermined transmission of a supplied light; and
   (d) means for mechanically coupling the second end of the light guide to the second data-link.

10. A method of obtaining temperature information of a target area at a first location and making such temperature information available at a second location that may be remote from the first location, comprising the steps of:
   arranging a light guide of predetermined temperature dependent characteristics in a path between a light source and a light detector and passing through the target area at the first location, said light guide having a first end proximate to said light source for receiving light therefrom and having a second end proximate to said light detector for supplying light thereto, said light detector being at the second location; the predetermined temperature dependent characteristic of said light guide being such that over a given temperature range it is reusably light transmissive over a first portion of the range and non-light-transmissive over a second portion of the range dependent upon the relative values of refractive indices of the core and cladding materials of said light guide;

supplying light from said light source to said first end of said light guide;

detecting by said light detector whether light is transmitted through said light guide to said second end to indicate whether the target area is in the first or second portion of the temperature range, said detecting is performed by (a) filtering the light thereby passing preselected wavelengths, (b) converting the filtered light into an electrical signal which is proportional to the intensity of the transmitted light, and (c) metering the electrical signal, said electrical signal being indicative of the temperature of the target area.

* * * * *